United States Patent [19]
Ostrowski

[11] Patent Number: 5,556,355
[45] Date of Patent: Sep. 17, 1996

[54] TRANSMISSION WITH PLANETARY MULTI-GEAR MEMBERS

[75] Inventor: Stanislaw Ostrowski, Gusher, Utah

[73] Assignee: Humming Bird Inc., Gusher, Utah

[21] Appl. No.: 290,237

[22] Filed: Aug. 15, 1994

[51] Int. Cl.$^6$ ................................................. F16H 1/28
[52] U.S. Cl. ........................................ 475/332; 475/339
[58] Field of Search ...................................... 475/332, 339

[56] References Cited

U.S. PATENT DOCUMENTS

| | | | |
|---|---|---|---|
| 1,334,401 | 3/1920 | Radiguer | 475/332 |
| 2,261,104 | 11/1941 | Birkigt | 475/332 |
| 4,166,401 | 9/1979 | Bohme et al. | 475/332 |
| 4,326,834 | 4/1982 | Ostrowski | 416/134 A |
| 4,422,486 | 12/1983 | Maret | 475/332 |
| 5,083,989 | 1/1992 | Yates et al. | 475/332 |
| 5,238,461 | 8/1993 | Gotman | 475/332 |

*Primary Examiner*—Dirk Wright
*Attorney, Agent, or Firm*—Thorpe, North & Western

[57] ABSTRACT

An improved transmission for transferring torque. First and second gears are each configured for integral, rigid attachment to first and second torque-bearing bodies, respectively. A third gears is disposed in simultaneous meshing engagement with the first and second gears such that said first and second gears are disposed in substantial co-axial orientation. The gears are configured such that rotation of a first of the three gears relative to a second of the three gears causes rotation of the remaining third gear via the various meshing engagements to thereby accomplish a transfer of torque from the first gear to the third gear.

11 Claims, 1 Drawing Sheet

U.S. Patent    Sep. 17, 1996    5,556,355
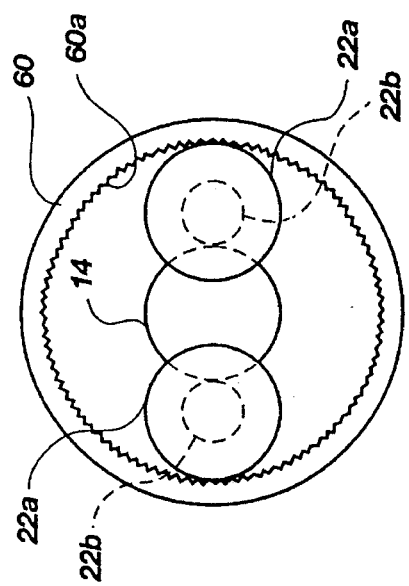
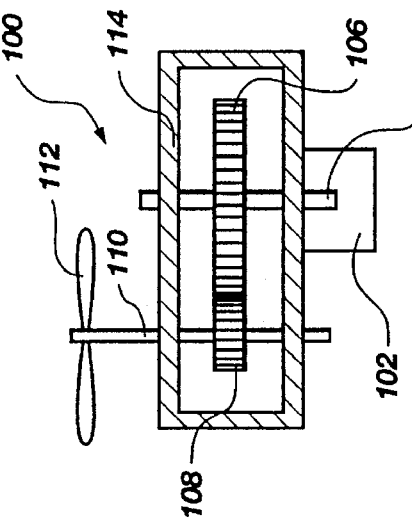
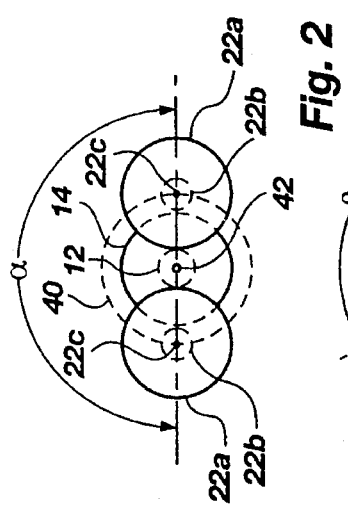
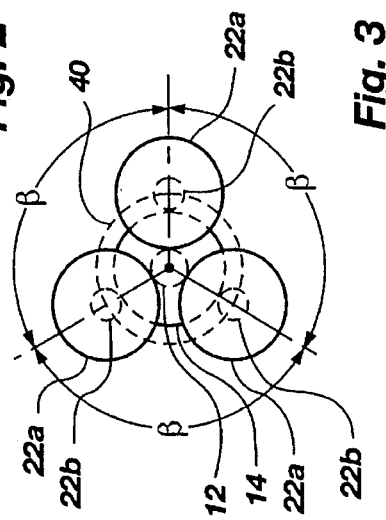
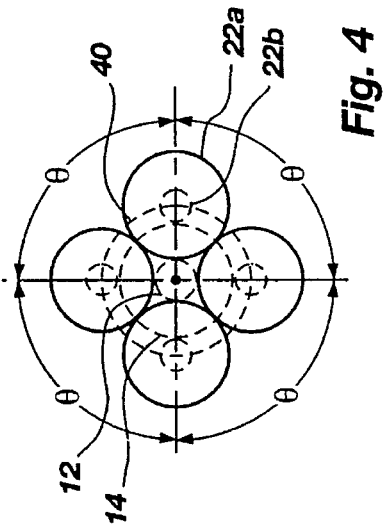
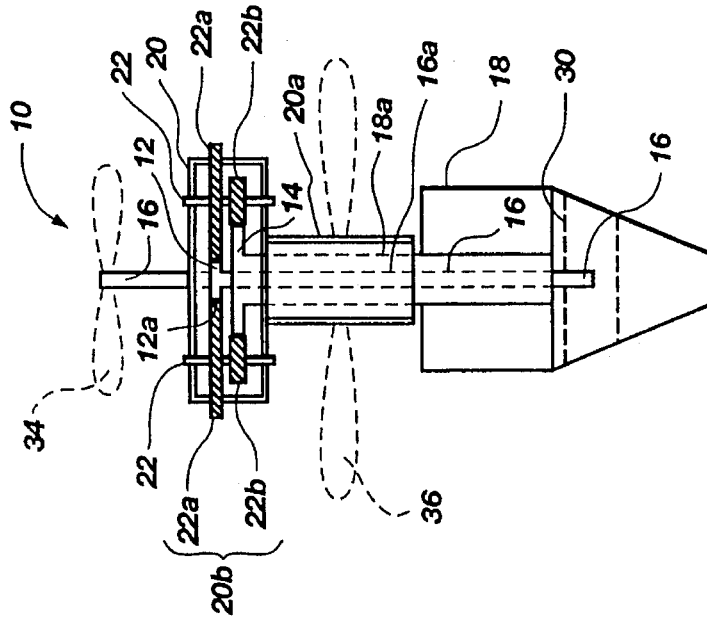

TRANSMISSION WITH PLANETARY MULTI-GEAR MEMBERS

BACKGROUND OF THE INVENTION

1. The Field of the Invention

The present invention relates generally to the field of mechanical transmissions. More particularly, it concerns a transmission which significantly minimizes energy dissipation.

2. The Background Art

Transmission devices are well known in the field of motorized vehicles for converting and transmitting the power generated by an engine to an output shaft. A persisting problem in transmissions, and in most if not all mechanical devices, is the effects of vibration and other reactionary forces which result in energy dissipation.

It is well known in the field of physics that a single isolated force is an impossibility—any single force is only one aspect of a mutual interaction between two bodies. When a first body exerts a force on a second body, the second body always exerts an equal and opposite "reaction" force on the first body. In mechanical transmissions, the gear box and other stabilizing structure provide the eventual reaction force, in response to the engine force, necessary to hold the gears together and maintain them in meshing engagement. Such stabilizing structure must often absorb large amounts of energy, much of which is released in the form of vibrational movement, heat and sound. The repeated jarring and shaking of the vibrational movement weakens the structure and its various interconnections, and the heating/cooling cycle weakens the material. Of current interest is an improved transmission which minimizes energy dissipation and the accompanying vibration, heat and sound.

OBJECTS AND SUMMARY OF THE INVENTION

It is therefore an object of the present invention to provide an improved transmission for transferring torque from a first body to a second body.

It is another object of the invention to provide such a transmission which is relatively simple in design and operation.

The above objects and others not specifically recited are realized in a specific illustrative embodiment of an improved transmission for transferring torque. First and second gear means are each configured for integral, rigid attachment to first and second torque-bearing bodies, respectively. A third gear means is disposed in simultaneous meshing engagement with the first and second gear means such that said first and second gear means are disposed in substantial co-axial orientation. The gear means are configured such that rotation of one of the three gear means relative to another of said three gear means causes rotation of the remaining gear means via the various meshing engagements to thereby accomplish a transfer of torque from said one of the three gear means to said remaining gear means.

Additional objects and advantages of the invention will be set forth in the description which follows, and in part will be apparent from the description, or may be learned by the practice of the invention. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawings in which:

FIG. 1 illustrates a side, partially interior view of a transmission in accordance with the principles of the present invention;

FIG. 2 illustrates a top view of the gears of the transmission of FIG. 1;

FIG. 3 illustrates a top view of an alternative embodiment of the gears of FIG. 2;

FIG. 4 illustrates a top view of another alternative embodiment of the gears of FIG. 2;

FIG. 5 illustrates a top view of a further alternative embodiment of the gears of FIG. 2; and FIG. 6 illustrates a side, cross-sectional view of a conventional transmission device.

DETAILED DESCRIPTION OF PRESENTLY PREFERRED EMBODIMENTS

Referring now to FIG. 1, there is shown an embodiment of a transmission, generally designated at 10, made in accordance with the present invention. First and second gears 12 and 14, respectively, are integrally, rigidly attached to first and second torque-bearing bodies 16 and 18, respectively. A third torque-bearing body 20 has planetary multi-gear members 22 rotatably mounted therein. Each planetary multi-gear member 22 includes upper and lower transfer gears 22a and 22b, respectively, which are rigidly interconnected and disposed in substantial co-axial orientation. Alternative embodiments may utilize planetary multi-gear members having three or more transfer gears as can be appreciated by those having ordinary skill in the field. Further, although two or more planetary multi-gear members 22 is preferable, the transmission 10 may be built with only one planetary multigear member. As shown in FIG. 1, the upper and lower transfer gears 22a and 22b comprise an intermediate planetary gear and a secondary planetary gear having differing gear ratios, respectively, which are rigidly intercoupled by an intermediate shaft 22d.

As shown in FIG. 1, the second gear 14 comprises a central gear rigidly coupled a power source 30 such that the central gear remains in a fixed orientation with respect to the power source. The power source 30 can apply be applied to the input shaft 16 to thereby cause rotational movement of the input shaft and attached input gear 12 relative to the central gear 14 and responsive rotational movement of the planetary gears 22a–b.

The upper transfer gears 22a are all disposed in simultaneous meshing engagement with the first gear 12, and the lower transfer gears 22b are all disposed in simultaneous meshing engagement with the second gear 14, with the first and second gears 12 and 14 being disposed in substantial co-axial orientation. In such a configuration, rotation of one of the three torque-bearing bodies 16, 18 or 20 relative to another of said three torque-bearing bodies causes rotation of the remaining torque-bearing body via the various meshing engagements, to thereby accomplish a transfer of torque from said one of the three torque-bearing bodies to said remaining torque-bearing body.

In a presently preferred embodiment, the first torque-bearing body 16 is an elongate shaft and the second torque-bearing body 18 is a hollow elongate shaft, with the first shaft 16 residing substantially co-axially within the second shaft 18, both of which reside in substantial co-axial alignment with the third torque-bearing body 20. The third torque-bearing body 20 includes a hollow shaft portion 20a, and portions 16a of the first shaft 16 and 18a of the second shaft 18 reside substantially co-axially within the hollow shaft portion 20a of the third torque-bearing body. The upper portion 20b of the third torque-bearing body 20 operates as a positioning means for (i) holding the upper and lower second gears 22a and 22b in engagement with the first and second gears 12 and 14 so as to enable development of a counter-rotation as explained more fully below. With the gears held together by the upper portion 20b of the third torque-bearing body 20, rotational movement of any one of the first, second, or third bodies will automatically be shifted, when said body is restrained against rotation, to the remaining torque-bearing bodies.

One illustrative application of the transmission 10 is to attach a power source 30 such as a motor (represented schematically in phantom line) rigidly to the second torque-bearing body 18 and apply a rotational force from the motor to the first torque-bearing body 18. It will be appreciated that this accomplishes rotation of the first torque-bearing body 16 relative to the second torque-bearing body 18, which causes rotation of the third torque-bearing body 20 in counter-rotation relative to said first torque-bearing body 18. With the second torque-bearing body 18 held fixed relative to the power source 30, the rotating first and third torque-bearing bodies 16 and 20 can be applied to some useful purpose, such as to upper and lower propellers 34 and 36, respectively. It will be further appreciated that holding the third torque-bearing body 20 stationary and rotating either the first or third torque-bearing body 16 or 18 causes rotation of the other of the first or third torque-bearing bodies in the same rotational direction, as opposed to the counter-rotation in the previous example.

As shown in FIG. 1, the third torque-bearing body 20 operates as an output means 20 having the intermediate shaft 22c rotatably journalled therein for (i) holding the intermediate and secondary planetary gears 22a–b in meshing engagement with the input gear 12 and central gear 14, respectively, and (ii) rotating at a different rate of angular rotation from the input shaft 16 responsive to rotational movement of the planetary gears 22a–b relative to the central gear 14.

The advantages of the transmission 10 include utilization of both action and reaction forces. This can be best understood by a comparison to a conventional transmission 100 as shown in FIG. 6. Isaac Newton's third law of motion states that "[t]o every action there is always opposed an equal reaction; or, the mutual actions of two bodies upon each other are always equal, and directed to contrary parts." Halliday, David and Resnick, Robert, *Fundamentals of Physics*, 2d ed., John Wiley & Sons 1986 at 71. It will be appreciated that when a motor 102 applies a rotational force to an input shaft 104 of the conventional transmission 100, the transmission 100 must exert an opposing reaction force according to Newton's third law. The effect internally is that the action force of the motor 20 passes from the input shaft 104 to a first gear 106, second gear 108, output shaft 110 and propeller 112.

Further inspection of FIG. 6 reveals that the input and output shafts 104 and 110 are held in place by the walls of a gear box 114, such that the shafts exert an action force upon the gear box and the gear box exerts an opposing reaction force upon the shafts. What happens to the internal reaction forces? They are released in the form of vibrational movement, sound and heat, for example. The effects of these internal reaction forces can be observed by the gear box 114 which vibrates and heats up in ultimate response to holding the rotating shafts 104 and 110 in place.

Applicant has discovered the surprising result that when the prior art gear box 114 is itself provided with a rigidly attached gear which is meshed appropriately with input and output gear members, the internal reaction forces can be applied as useable energy instead of being released in the formed of wasted vibrational movement, heat and sound. When applicant's transmission 10 of FIG. 1 is compared with the conventional transmission 100 of FIG. 6, it can be seen that all of the three main bodies 16, 18 and 20 of applicant's transmission 10 are provided with gears which are meshably interconnected, whereas only two of the three main bodies of the conventional transmission 100 (input shaft 104 and output shaft 110) have gears while the bear box 114 does not. The second torque-bearing body 18 is analogous to the prior art gear box 114—both are attached to power sources 30 and 102, respectively—except that the body 18 is rigidly attached to the second gear 14 which acts as a central gear hub about which the lower transfer gears 22b meshably rotate. The net effect is that the prior art gear box 114 provides an internal reaction force which is released as vibration, heat and sound, while applicants "gear box" body 18 and rigidly attached gear 14 exert an opposing reaction force upon the gears 22b via meshing engagement.

Internal reaction forces in applicant's transmission 10 thus include the gear teeth of the second gear 14 acting upon the lower transfer gears 22b in response to the action force of the first gear 12 acting upon the upper transfer gears 22a. In this manner, internal reaction forces are utilized for additional gear movement and power instead of being wasted as vibration, heat and sound. The reaction forces are thereby complemented with the action forces so as to require less input power to provide a given power output. The co-axial relationship of the torque-bearing bodies 16, 18 and 20 combines with a balanced, symmetrical configuration of the planetary multi-gear members 22 about the first and second gears 12 and 14 to cause the lower transfer gears 22b to mesh against opposing sides of the second gear 14. The second gear 14 is thereby forced to react against the lower transfer gears 22b to cause additional rotational movement, such that the "gear box" body 18 is not forced to provide reaction forces as is the conventional gear box 114 of FIG. 6. Vibration and heating of the body 18 is thus significantly reduced, if not eliminated. It could be said, conceptually, that in the conventional transmission 110 of FIG. 6 the reaction forces are "bolted down" or directed into a body which is bolted down, whereas the second gear 14 of applicant's transmission releases the reaction forces and puts them to use. Applicant has found that energy waste is minimized if not substantially eliminated, and has observed little if any noticeable release of extraneous vibrational movement, heat or sound.

One way to visualize the effect of applicant's invention is to imagine comparative applications of applicant's transmission 10 and the conventional transmission 100 in the absence of gravitational influence, such as in outer space. A user may apply a hand-held electric drill to the input shaft 104 of the conventional transmission 100 in order to turn the propeller 112. In such a weightless environment, however, the user could not rely on his or her weight to counteract the reaction torque; the user would need to be braced against a wall or other structure to prevent himself or herself from being turned in response to actuation of the drill and the reaction force of the transmission 100. However, application of the hand-held drill to the first torque bearing body 16 of applicant's transmission 10 would result in little if any rotation of the user in space because the reaction torque upon the body 18 is effectively eliminated as explained above to substantially eliminate a reaction force upon the hand-held drill.

It is to be understood that the planetary multi-gear members 22 are balanced in their position about the second gear 14, in accordance with the following description. The axes of rotation 22c of the multi-gear members 22 are disposed substantially equidistantly along a circle 40 extending co-axially about a co-axis of rotation 42 of the first and second gears 12 and 14, so as to be symmetrically disposed relative to said co-axis 42. Therefore, when only two planetary multi-gear members 22 are used as shown in FIG. 2, their axes of rotation 22c are spaced apart along a circle 40 at an angular interval α equal to 180 degrees. When only three planetary multi-gear members 22 are used as shown in FIG. 3, their axes of rotation 22c are spaced apart along a circle 40 at an angular interval β equal to 120 degrees. When only four planetary multi-gear members 22 are used as shown in FIG. 4, their axes of rotation 22c are spaced apart along a circle 40 at an angular interval θ equal to 90 degrees.

The number of gear teeth of the gears 14, 16, 22a and 22b are indexed according to the number of planetary multi-gear members 22 used. For example, when an even number of planetary multi-gear members 22 are used such as two or four, the gears 14, 16, 22a and 22b must each have an even number of gear teeth. Some applications may require that the gears 14, 16, 22a and 22b each have a number of gear teeth divisible by four. When three planetary multi-gear members 22 are used, the gears 14, 16, 22a and 22b must each have a number of gear teeth divisible by three.

It will be appreciated that the gear arrangement of FIG. 1 accomplishes the advantages discussed above regardless of which torque-bearing body receives the applied input force. A power source 30 may be applied to any one of the three torque-bearing bodies 16, 18 or 20 so as to cause it to rotate relative to another of said bodies. It will be appreciated that when the third torque-bearing body 20 is held stationary relative to the power source 30 and the power source is applied to either the first or second torque-bearing bodies 16 or 18, the planetary multi-gear members 22 rotate about a fixed axis of rotation without actually orbiting. In the other combinations of power application with the power source 30 being held stationary relative to either the first or second torque-bearing bodies 16 or 18, the planetary multi-gear members 22 orbit. Therefore, the term "planetary gear" as used herein shall not be limited to refer to an orbiting gear, but shall refer broadly to any gear being in meshing engagement with a central-type gear. The first and second gears 12 and 14 may accordingly be referred to as "sun gears."

It will be appreciated that the central novel discovery embodied in applicant's transmission 10 can assume many different forms and configurations. For example, either or both of the first and second gears 12 and 14 may instead comprise an annulus having interior gear teeth instead of a sun gear having exterior gear teeth. The first gear 12 of FIG. 1 having exterior gear teeth 12a may, for example, be replaced with an annulus 60 having interior gear teeth 60a in meshing engagement with the upper transfer gears 22a as in FIG. 5.

A presently preferred method for transferring torque in accordance with the present invention includes the steps of:

(a) integrally and rigidly attaching first and second gear means to first and second torque-bearing bodies, respectively;

(b) rotatably mounting, at least two planetary multi-gear members in a third torque-bearing body to thereby form a third gear means, wherein each planetary multi-gear member includes upper and lower, rigidly-interconnected transfer gears disposed in substantial co-axial orientation;

(c) placing all of said upper transfer gears in simultaneous meshing engagement with the first gear means and placing all of said lower transfer gears in simultaneous meshing engagement with the second gear means, such that said first and second gear means are disposed in substantial co-axial orientation and such that rotation of one of the three torque-bearing bodies relative to another of said three torque-bearing bodies causes rotation of the remaining torque-bearing body via the various meshing engagements to thereby accomplish a transfer of torque from said one of the three torque-bearing bodies to said remaining torque-bearing body; and (d) positioning axes of rotation of the planetary multi-gear members substantially equidistantly along a circle extending co-axially about a co-axis of rotation of the first and second gear means such that said axes of rotation of the planetary multi-gear members are symmetrically disposed relative to said co-axis of rotation of the first and second gear means.

It is to be understood that the transmission 10 has numerous applications which are covered by the appended claims. For example, a helicopter body could be secured to the second torque-bearing body 18 to be lifted and flown by the two propellers 34 and 36. The transmission 10 could be used in automobiles, machinery and the like, and could be used to simply replace existing transmissions.

As shown in FIG. 1, the input shaft 16 includes a proximal section 16a and a distal output section 16b extending outwardly from opposing sides of the input gear 12 in proximal and distal directions, respectively. The output means 20 includes a carrier body or upper portion 20b in which the intermediate shaft 22d is rotatably journalled (as shown) and a hollow output body 20a. The distal output section 16b and the hollow output body 20a extend outwardly from the carrier body 20b in opposing distal and proximal directions, respectively. Preferably, the distal output section 16b and the hollow output body 20a are exposed for application to output load structure such as wheels or the propellers 34 and 36, and are unencumbered with any surrounding structure which might prevent such application to output load structure.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A transmission device comprising:

an input shaft for receiving rotational power from an attached power source;

a fixed input gear coaxially mounted on the input shaft;

at least one intermediate, planetary gear disposed in meshing engagement with the fixed input gear;

an intermediate shaft concentrically coupled to the at least one intermediate, planetary gear in fixed relationship;

at least one secondary planetary gear rigidly coupled to the intermediate shaft and having a differing gear ratio from the intermediate planetary gear such that the intermediate shaft and the at least one intermediate and secondary planetary gears form at least one planetary multi-gear member;

a central gear disposed in meshing engagement with the secondary planetary gear and being positioned in substantial co-axial orientation with respect to the input gear and input shaft; and output means having the intermediate shaft rotatably journalled therein for (i) holding the intermediate and secondary planetary gears in meshing engagement with the input gear and central gear, respectively, and (ii) rotating at a different rate of angular rotation from the input shaft responsive to rotational movement of the planetary gears relative to the central gear.

2. The transmission device as defined in claim 1, wherein the input shaft includes a proximal section and a distal output section extending outwardly from opposing sides of the input gear in proximal and distal directions, respectively, and wherein the output means includes a carrier body in which the intermediate shaft is rotatably journalled and a hollow output body, and wherein the distal output section and the hollow output body extend outwardly from the carrier body in opposing distal and proximal directions, respectively, wherein the distal output section and the hollow output body are exposed for application to output load structure and are unencumbered with any surrounding structure which might prevent such application to output load structure.

3. The transmission device as defined in claim 2, further comprising:

first and second loading means for loading the distal output section and the hollow output body, respectively, with output load structure.

4. The transmission device as defined in claim 1, wherein the input shaft includes a proximal section and a distal output section extending outwardly from opposing sides of the input gear in proximal and distal directions, respectively, and wherein the output means includes a carrier body in which the intermediate shaft is rotatably journalled and a hollow output body, and wherein the distal output section and the hollow output body extend outwardly from the carrier body in opposing distal and proximal directions, respectively, said transmission device further comprising:

first and second loading means for loading the distal output section and the hollow output body, respectively, with output load structure.

5. The transmission device as defined in claim 1, wherein the at least one planetary multi-gear member comprises an even-numbered plurality of planetary multi-gear members, and wherein the input gear, central gear, intermediate planetary gears and secondary planetary gears each comprise an even number of gear teeth.

6. The transmission device as defined in claim 1, wherein the at least one planetary multi-gear member comprises three planetary multi-gear members, and wherein the input gear, central gear, intermediate planetary gears and secondary planetary gears each comprise a number of gear teeth which is divisible by three.

7. A transmission device comprising:

an input shaft for receiving rotational power from an attached power source;

a fixed input gear coaxially mounted on the input shaft;

at least one intermediate, planetary gear disposed in meshing engagement with the fixed input gear;

an intermediate shaft concentrically coupled to the at least one intermediate, planetary gear in fixed relationship;

at least one secondary planetary gear rigidly coupled to the intermediate shaft and having a differing gear ratio from the intermediate planetary gear such that the intermediate shaft and the at least one intermediate and secondary planetary gears form at least one planetary multi-gear member;

a central gear disposed in meshing engagement with the secondary planetary gear; and output means having the intermediate shaft rotatably journalled therein for (i) holding the intermediate and secondary planetary gears in meshing engagement with the input gear and central gear, respectively, and (ii) rotating responsive to rotational movement of the planetary gears relative to the central gear;

wherein the input shaft includes a proximal section and a distal output section extending outwardly from opposing sides of the input gear in proximal and distal directions, respectively, and wherein the output means includes a carrier body in which the intermediate shaft is rotatably journalled and a hollow output body, and wherein the distal output section and the hollow output body extend outwardly from the carrier body in opposing distal and proximal directions, respectively, wherein the distal output section and the hollow output body are exposed for application to output load structure and are unencumbered with any surrounding structure which might prevent such application to output load structure.

8. The transmission device as defined in claim 7, further comprising:

first and second loading means for loading the distal output section and the hollow output body, respectively, with output load structure.

9. A method for transferring torque, said method comprising the steps of:

(a) fixedly mounting an input gear co-axially upon an input shaft;

(b) fixedly mounting an intermediate planetary gear and a secondary planetary gear co-axially upon an intermediate shaft to thereby form at least one planetary multi-gear member, wherein the secondary planetary gear has a differing gear ratio from the intermediate planetary gear;

(c) selecting a central gear;

(d) placing the intermediate planetary gear in meshing engagement with the fixed input gear and the secondary planetary gear in meshing engagement with the central gear; and (e) rotatably journalling the intermediate shaft in an output means for (1) holding the intermediate and secondary planetary gears in meshing engagement with the input gear and central gear, respectively, and (2) rotating at a different rate of angular rotation from the input shaft responsive to rotational movement of the planetary gears relative to the central gear; and (f) rigidly coupling a power source to the central gear such that said central gear remains in a fixed orientation with respect to said power source, and applying said power source to the input shaft to thereby cause rotational movement of said input shaft and attached input gear relative to said central gear and responsive rotational movement of the planetary gears.

10. The method as defined in claim 9, wherein step (a) further comprises mounting the input gear upon an input shaft having a proximal section and a distal output section such that said proximal and distal sections extend outwardly from opposing sides of the input gear in proximal and distal directions, respectively, and wherein step (e) further comprises rotatably journalling the intermediate shaft within an output means having a carrier body in which the intermediate shaft has been journalled and a hollow output body such that said distal output section and hollow output body extend outwardly from the carrier body in opposing distal and proximal directions, respectively, and such that the distal output section and the hollow output body are exposed for application to output load structure and are unencumbered with any surrounding structure which might prevent such application to output load structure, said method further comprising the step of:

(g) loading the distal output section with output load structure.

11. The method as defined in claim 10, wherein step (g) further comprises loading the hollow output body with output load structure.

* * * * *